US009280266B2

(12) United States Patent
Chae et al.

(10) Patent No.: US 9,280,266 B2
(45) Date of Patent: Mar. 8, 2016

(54) APPARATUS AND METHOD FOR DISPLAYING INFORMATION AS BACKGROUND OF USER INTERFACE

(75) Inventors: Haeng-Suk Chae, Gyeonggi-do (KR); Kyoung-Tae Choi, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 1135 days.

(21) Appl. No.: 13/253,465

(22) Filed: Oct. 5, 2011

(65) Prior Publication Data

US 2012/0120110 A1 May 17, 2012

(30) Foreign Application Priority Data

Nov. 12, 2010 (KR) .......................... 10-2010-0112652

(51) Int. Cl.
*G06F 3/0484* (2013.01)
*G06T 11/00* (2006.01)

(52) U.S. Cl.
CPC .............. *G06F 3/0484* (2013.01); *G06T 11/00* (2013.01)

(58) Field of Classification Search
CPC .............. G06F 3/0483; G06F 3/04817; G06F 17/30899; G06F 3/048; G06F 3/0482; G06F 17/3089
USPC ........................................................ 345/660
See application file for complete search history.

(56) References Cited

U.S. PATENT DOCUMENTS

| 6,323,846 | B1 | 11/2001 | Westerman et al. |
| 6,888,536 | B2 | 5/2005 | Westerman et al. |
| 6,920,606 | B1 | 7/2005 | Jablonski et al. |
| 7,339,580 | B2 | 3/2008 | Westerman et al. |
| 7,469,381 | B2 | 12/2008 | Ording |
| 7,479,949 | B2 | 1/2009 | Jobs et al. |
| 7,587,683 | B2 | 9/2009 | Ito et al. |
| 7,599,044 | B2 | 10/2009 | Hotelling et al. |
| 7,614,008 | B2 | 11/2009 | Ording |
| 7,619,618 | B2 | 11/2009 | Westerman et al. |
| 7,633,076 | B2 | 12/2009 | Huppi et al. |
| 7,653,883 | B2 | 1/2010 | Hotelling et al. |
| 7,656,394 | B2 | 2/2010 | Westerman et al. |
| 7,671,756 | B2 | 3/2010 | Herz et al. |
| 7,694,231 | B2 | 4/2010 | Kocienda et al. |
| 7,714,265 | B2 | 5/2010 | Fadell et al. |
| 7,728,316 | B2 | 6/2010 | Fadell et al. |

(Continued)

FOREIGN PATENT DOCUMENTS

| JP | 2006-012053 A | 1/2006 |
| JP | 2006-185273 A | 7/2006 |

(Continued)

OTHER PUBLICATIONS

Korean translation for KR 10-2010-0063546.*

*Primary Examiner* — James A Thompson
(74) *Attorney, Agent, or Firm* — IP Legal Services, LLC

(57) ABSTRACT

Apparatus and method for displaying information as a background of a user interface. In order to display the information as the background of a user interface, information such as user interest information may be received from a user. Based on the received information, contents may be retrieved. Then, the background of the user interface may be formed with at least one image. Each image of the at least one image may represent a respective one of the retrieved contents. The user interface having the background formed with the at least one image may be displayed.

20 Claims, 6 Drawing Sheets

(56) References Cited

U.S. PATENT DOCUMENTS

| | | | |
|---|---|---|---|
| 7,760,187 B2 | 7/2010 | Kennedy | |
| 7,764,274 B2 | 7/2010 | Westerman et al. | |
| 7,782,307 B2 | 8/2010 | Westerman et al. | |
| 7,812,828 B2 | 10/2010 | Westerman et al. | |
| 7,843,427 B2 | 11/2010 | Ording et al. | |
| 7,844,914 B2 | 11/2010 | Andre et al. | |
| 7,856,605 B2 | 12/2010 | Ording et al. | |
| 7,864,163 B2 | 1/2011 | Ording et al. | |
| 7,900,156 B2 | 3/2011 | Andre et al. | |
| 7,934,156 B2 | 4/2011 | Forstall et al. | |
| 7,940,250 B2 | 5/2011 | Forstall | |
| 7,941,760 B2 | 5/2011 | Kocienda et al. | |
| 7,956,849 B2 | 6/2011 | Anzures et al. | |
| 7,966,578 B2 | 6/2011 | Tolmasky et al. | |
| 7,975,242 B2 | 7/2011 | Forstall et al. | |
| 7,978,176 B2 | 7/2011 | Forstall et al. | |
| 7,978,182 B2 | 7/2011 | Ording et al. | |
| 7,996,792 B2 | 8/2011 | Anzures et al. | |
| 8,013,839 B2 | 9/2011 | Ording et al. | |
| 8,014,760 B2 | 9/2011 | Forstall et al. | |
| 8,060,825 B2 | 11/2011 | Chaudhri | |
| 8,063,872 B2 | 11/2011 | Forstall et al. | |
| 8,082,523 B2 | 12/2011 | Forstall et al. | |
| 8,091,045 B2 | 1/2012 | Christie et al. | |
| 8,106,856 B2 | 1/2012 | Matas et al. | |
| 8,116,807 B2 | 2/2012 | Matas | |
| 8,130,205 B2 | 3/2012 | Forstall et al. | |
| 8,135,389 B2 | 3/2012 | Forstall et al. | |
| 8,171,432 B2 | 5/2012 | Matas et al. | |
| 8,209,606 B2 | 6/2012 | Ording | |
| 8,223,134 B1 | 7/2012 | Forstall et al. | |
| 8,239,784 B2 | 8/2012 | Hotelling et al. | |
| 8,253,695 B2 | 8/2012 | Ganatra et al. | |
| 8,255,003 B2 | 8/2012 | Forstall et al. | |
| 2002/0054106 A1* | 5/2002 | Mugura | G06F 3/0236 715/764 |
| 2002/0154147 A1* | 10/2002 | Battles | 345/660 |
| 2006/0022956 A1 | 2/2006 | Lengeling et al. | |
| 2006/0026521 A1 | 2/2006 | Hotelling et al. | |
| 2006/0026536 A1 | 2/2006 | Hotelling et al. | |
| 2006/0033724 A1 | 2/2006 | Chaudhri et al. | |
| 2006/0161870 A1 | 7/2006 | Hotelling et al. | |
| 2006/0238518 A1 | 10/2006 | Westerman et al. | |
| 2006/0238520 A1 | 10/2006 | Westerman et al. | |
| 2006/0238522 A1 | 10/2006 | Westerman et al. | |
| 2007/0070050 A1 | 3/2007 | Westerman et al. | |
| 2007/0070051 A1 | 3/2007 | Westerman et al. | |
| 2007/0078919 A1 | 4/2007 | Westerman et al. | |
| 2007/0081726 A1 | 4/2007 | Westerman et al. | |
| 2007/0152980 A1 | 7/2007 | Kocienda et al. | |
| 2007/0168865 A1* | 7/2007 | Tsutsumi et al. | 715/716 |
| 2007/0171210 A1 | 7/2007 | Chaudhri et al. | |
| 2007/0174788 A1 | 7/2007 | Ording | |
| 2007/0174791 A1 | 7/2007 | Park et al. | |
| 2007/0268273 A1 | 11/2007 | Westerman et al. | |
| 2007/0268274 A1 | 11/2007 | Westerman et al. | |
| 2007/0268275 A1 | 11/2007 | Westerman et al. | |
| 2008/0036743 A1 | 2/2008 | Westerman et al. | |
| 2008/0041639 A1 | 2/2008 | Westerman et al. | |
| 2008/0042986 A1 | 2/2008 | Westerman et al. | |
| 2008/0042987 A1 | 2/2008 | Westerman et al. | |
| 2008/0042988 A1 | 2/2008 | Westerman et al. | |
| 2008/0042989 A1 | 2/2008 | Westerman et al. | |
| 2008/0055263 A1 | 3/2008 | Lemay et al. | |
| 2008/0055269 A1 | 3/2008 | Lemay et al. | |
| 2008/0082930 A1 | 4/2008 | Omernick et al. | |
| 2008/0094370 A1 | 4/2008 | Ording et al. | |
| 2008/0098331 A1 | 4/2008 | Novick et al. | |
| 2008/0122796 A1 | 5/2008 | Jobs et al. | |
| 2008/0128182 A1 | 6/2008 | Westerman et al. | |
| 2008/0165142 A1 | 7/2008 | Kocienda et al. | |
| 2008/0165143 A1 | 7/2008 | Tolmasky et al. | |
| 2008/0165145 A1 | 7/2008 | Herz et al. | |
| 2008/0165147 A1 | 7/2008 | Christie et al. | |
| 2008/0165148 A1 | 7/2008 | Williamson et al. | |
| 2008/0165149 A1 | 7/2008 | Platzer et al. | |
| 2008/0165151 A1 | 7/2008 | Lemay et al. | |
| 2008/0165152 A1 | 7/2008 | Forstall et al. | |
| 2008/0165153 A1 | 7/2008 | Platzer et al. | |
| 2008/0165160 A1 | 7/2008 | Kocienda et al. | |
| 2008/0168349 A1 | 7/2008 | Lamiraux et al. | |
| 2008/0168353 A1 | 7/2008 | Anzures et al. | |
| 2008/0168395 A1 | 7/2008 | Ording et al. | |
| 2008/0168396 A1 | 7/2008 | Matas et al. | |
| 2008/0201650 A1 | 8/2008 | Lemay et al. | |
| 2008/0204426 A1 | 8/2008 | Hotelling et al. | |
| 2008/0211775 A1 | 9/2008 | Hotelling et al. | |
| 2008/0211783 A1 | 9/2008 | Hotelling et al. | |
| 2008/0211784 A1 | 9/2008 | Hotelling et al. | |
| 2008/0211785 A1 | 9/2008 | Hotelling et al. | |
| 2008/0216005 A1* | 9/2008 | Bamba | G06F 3/0482 715/765 |
| 2008/0220752 A1 | 9/2008 | Forstall et al. | |
| 2008/0222545 A1 | 9/2008 | Lemay et al. | |
| 2008/0231610 A1 | 9/2008 | Hotelling et al. | |
| 2008/0320391 A1 | 12/2008 | Lemay et al. | |
| 2008/0320419 A1 | 12/2008 | Matas et al. | |
| 2009/0005011 A1 | 1/2009 | Christie et al. | |
| 2009/0006570 A1 | 1/2009 | Forstall et al. | |
| 2009/0006644 A1 | 1/2009 | Forstall et al. | |
| 2009/0007017 A1 | 1/2009 | Anzures et al. | |
| 2009/0021489 A1 | 1/2009 | Westerman et al. | |
| 2009/0058830 A1 | 3/2009 | Herz et al. | |
| 2009/0064049 A1 | 3/2009 | Pyhalammi et al. | |
| 2009/0066728 A1 | 3/2009 | Ording | |
| 2009/0070704 A1 | 3/2009 | Ording | |
| 2009/0070705 A1 | 3/2009 | Ording | |
| 2009/0077488 A1 | 3/2009 | Ording | |
| 2009/0091550 A1 | 4/2009 | Lim et al. | |
| 2009/0093276 A1 | 4/2009 | Kim et al. | |
| 2009/0100462 A1 | 4/2009 | Park et al. | |
| 2009/0160816 A1 | 6/2009 | Westerman et al. | |
| 2009/0174680 A1 | 7/2009 | Anzures et al. | |
| 2009/0177981 A1 | 7/2009 | Christie et al. | |
| 2009/0178008 A1 | 7/2009 | Herz et al. | |
| 2009/0244031 A1 | 10/2009 | Westerman et al. | |
| 2009/0244032 A1 | 10/2009 | Westerman et al. | |
| 2009/0244033 A1 | 10/2009 | Westerman et al. | |
| 2009/0249236 A1 | 10/2009 | Westerman et al. | |
| 2009/0251435 A1 | 10/2009 | Westerman et al. | |
| 2009/0251438 A1 | 10/2009 | Westerman et al. | |
| 2009/0251439 A1 | 10/2009 | Westerman et al. | |
| 2009/0259958 A1* | 10/2009 | Ban | 715/765 |
| 2010/0048256 A1 | 2/2010 | Huppi et al. | |
| 2010/0066698 A1 | 3/2010 | Seo | |
| 2010/0149092 A1 | 6/2010 | Westerman et al. | |
| 2010/0149134 A1 | 6/2010 | Westerman et al. | |
| 2010/0177056 A1 | 7/2010 | Kocienda et al. | |
| 2010/0188357 A1 | 7/2010 | Kocienda et al. | |
| 2010/0188358 A1 | 7/2010 | Kocienda et al. | |
| 2010/0192086 A1 | 7/2010 | Kocienda et al. | |
| 2010/0207879 A1 | 8/2010 | Fadell et al. | |
| 2010/0218141 A1* | 8/2010 | Xu et al. | 715/834 |
| 2010/0259500 A1 | 10/2010 | Kennedy | |
| 2011/0080364 A1 | 4/2011 | Ording et al. | |
| 2011/0154188 A1 | 6/2011 | Forstall et al. | |
| 2011/0202882 A1 | 8/2011 | Forstall et al. | |
| 2011/0210933 A1 | 9/2011 | Forstall | |
| 2011/0219303 A1 | 9/2011 | Forstall | |
| 2011/0235990 A1 | 9/2011 | Anzures et al. | |
| 2011/0254800 A1 | 10/2011 | Anzures et al. | |
| 2011/0275418 A1 | 11/2011 | Forstall et al. | |
| 2012/0001913 A1* | 1/2012 | Lee | 345/428 |
| 2012/0127207 A1 | 5/2012 | Matas et al. | |
| 2012/0188248 A1* | 7/2012 | Eames et al. | 345/428 |
| 2012/0216139 A1 | 8/2012 | Ording et al. | |
| 2012/0218304 A1 | 8/2012 | Anzures et al. | |
| 2012/0221978 A1 | 8/2012 | Matas et al. | |

FOREIGN PATENT DOCUMENTS

| | | |
|---|---|---|
| JP | 2008-192002 A | 8/2008 |
| JP | 2008-217704 A | 9/2008 |
| KR | 20010073967 A | 8/2001 |

(56) References Cited

FOREIGN PATENT DOCUMENTS

| KR | 10-2003-0030774 A | 4/2003 |
|---|---|---|
| KR | 10-2005-0071998 A | 7/2005 |
| KR | 10-2006-0030270 A | 4/2006 |
| KR | 20060089021 A | 8/2006 |
| KR | 10-2007-0002816 A | 1/2007 |
| KR | 10-2007-0010331 A | 1/2007 |
| KR | 10-0688046 B1 | 3/2007 |
| KR | 10-0715832 B1 | 5/2007 |
| KR | 10-2007-0076936 A | 7/2007 |
| KR | 10-2007-0107888 A | 11/2007 |
| KR | 10-0775176 B1 | 11/2007 |
| KR | 10-2009-0033619 A | 4/2009 |
| KR | 10-2009-0034664 A | 4/2009 |
| KR | 10-2009-0034665 A | 4/2009 |
| KR | 10-2009-0060429 A | 6/2009 |
| KR | 10-2009-0106223 A | 10/2009 |
| KR | 10-2009-0107638 A | 10/2009 |
| KR | 10-2010-0025090 A | 3/2010 |
| KR | 10-2010-0032660 A | 3/2010 |
| KR | 10-2010-0050828 A | 5/2010 |
| KR | 10-2010-0099828 A | 9/2010 |
| KR | 10-2010-0134234 A | 12/2010 |
| KR | 10-2011-0023256 A | 3/2011 |

* cited by examiner

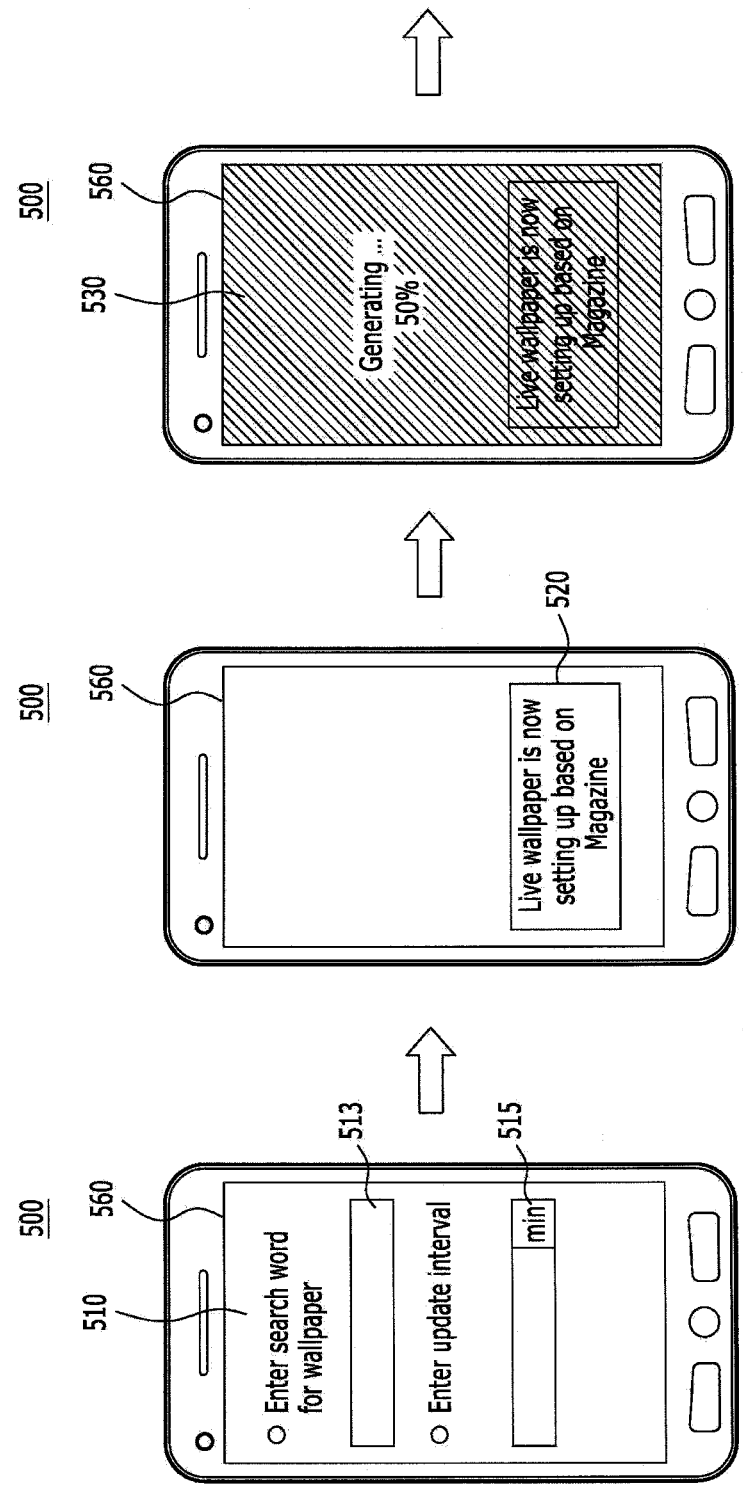

APPARATUS AND METHOD FOR DISPLAYING INFORMATION AS BACKGROUND OF USER INTERFACE

CROSS REFERENCE TO PRIOR APPLICATIONS

The present application claims priority under 35 U.S.C. §119 to Korean Patent Application No. 10-2010-0112652 (filed on Nov. 12, 2010), which is hereby incorporated by reference in its entirety.

FIELD OF THE INVENTION

Apparatuses and methods consistent with the present invention relate to displaying information as a background of a user interface, and more particularly, to setting up a background of a user interface with information and displaying the background so as to provide the most recent information that a user is interested about.

BACKGROUND OF THE INVENTION

A user equipment provides a user interface having a background image. The user equipment displays icons or key menus on the background image of the user interface. Most of time, the background image is the first thing a user sees whenever the user tries to use the user equipment. Since a still image has been used as the background image, the background image has not been used to provide any useful information to users.

Lately, an active background has been introduced. The active background may also be referred to as a live background, an active wallpaper, and/or a live wallpaper. In general, the active background may be a type of application that functions as a background image of a user interface and interacts with the user in response to a user action. However, the active background does not quickly and conveniently provide information that a user is interested about.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, information may be displayed as a background image of a user interface.

In accordance with another aspect of the present invention, a background of a user interface may be set up with a plurality of images each representing information that a user is interested about.

In accordance with still another aspect of the present invention, a web page associated with a selected image of a background may be displayed when a user selects the selected image of the background.

In accordance with an embodiment of the present invention, information may be displayed as a background of a user interface. In order to display the information as the background of the user interface, information such as user interest information may be received from a user. Based on the received information, contents may be retrieved. Then, the background of the user interface may be formed with at least one image. Each image of the at least one image may represent a respective one of the retrieved contents. The user interface having the background formed with the at least one image may be displayed.

In order to form the background, the at least one image may be extracted from the retrieved contents. Furthermore, supplementary data associated with the extracted at least one image may be extracted from the retrieved contents. The extracted at least one image may be mapped with corresponding supplementary data. A result of the mapping may be stored. The extracted at least one image may be arranged to form at least a portion of the background.

In order to form the background, at least one image of extracted at least one image may be selected according to a resolution of a display unit upon which the user interface is provided and a ranking associated with each image. The selected at least one image may be arranged to form at least a portion of the background.

While arranging the extracted at least one image, a size and a position of each of the extracted at least one image may be controlled according to a ranking associated with each image. The size of a first image of the extracted at least one image may be controlled to be larger than other images of the extracted at least one image when the first image has a ranking higher than the other images. Furthermore, the position of a first image of the extracted at least one image having a ranking higher than other images of the extracted at least one image may be positioned at a center of the background of the user interface.

After displaying the user interface, a selection input may be received for selecting a desired image from the background formed with the at least one image. Then, an access address of a web page corresponding to the selected desired image may be extracted based on the stored result of the mapping. Data for the corresponding web page may be retrieved using the extracted access address. The corresponding web page may be displayed based on the retrieved data.

The information received from the user may include at least one of a search word and an information type that the user is interested about. The contents may include at least one image related to the information received from the user and supplementary data associated with each image of the at least one image, and the supplementary data may include an access address and a ranking of a web page related to each image of the at least one image. Each image of the at least one image may represent a respective type of the information received from the user.

The ranking of each web page may be determined based on at least one of a user stipulation, an associated web server, a search frequency of related information type, and an Internet hit count of the corresponding web page.

After receiving the information from the user, a request may be transmitted to a web server to search for contents related to the received information. The web server may search for the related contents and provide the related contents.

After the user interface having the background is displayed, updated contents may be received. The displayed user interface having the background may be updated with the received updated contents at an update interval of time.

In accordance with another embodiment of the present invention, information may be displayed in a wallpaper of a user interface at a user equipment configured to be coupled to a web server through a communication network. In order to display the information in the wallpaper, an information type may be selected from at least one information type displayed on the user equipment. A request for contents may be transmitted to the web server based on the selected information type. Contents related to the selected information type may be received from the web server, and at least one image included in the received contents may be selected. The selected at least one image may be extracted. An access address of a respective web page associated with each one of the selected at least one image may be extracted. The extracted at least one image may be mapped with associated extracted access addresses associated with respective ones of the selected at least one image. The extracted at least one image may be arranged, and the extracted at least one image may be displayed as at least a portion of the wallpaper.

In accordance with still another embodiment of the present invention, an apparatus may be provided for displaying information as a background of a user interface. The apparatus may include an input unit, a communication unit, a formation unit, and a display unit. The input unit may be configured to receive information from a user. The communication unit may be configured to retrieve contents based on the received information. The formation unit may be configured to form the background of the user interface with at least one image. Each image of the at least one image may represent a respective one of the retrieved contents. The display unit may be configured to display the user interface having the background formed with the at least one image.

Furthermore, the formation unit may be configured to extract the at least one image from the retrieved contents, extract supplementary data associated with the extracted at least one image from the retrieved contents, map the extracted at least one image with corresponding supplementary data, store a result of the mapping, and arrange the extracted at least one image to form at least a portion of the background.

BRIEF DESCRIPTION OF THE DRAWINGS

The above and/or other aspects of the present invention will become apparent and more readily appreciated from the following description of embodiments, taken in conjunction with the accompanying drawings, of which:

FIGS. 5A and 5B illustrate another example of setting up and using a live wallpaper in accordance with an embodiment of the present invention.

DETAILED DESCRIPTION OF THE INVENTION

Figure 1:
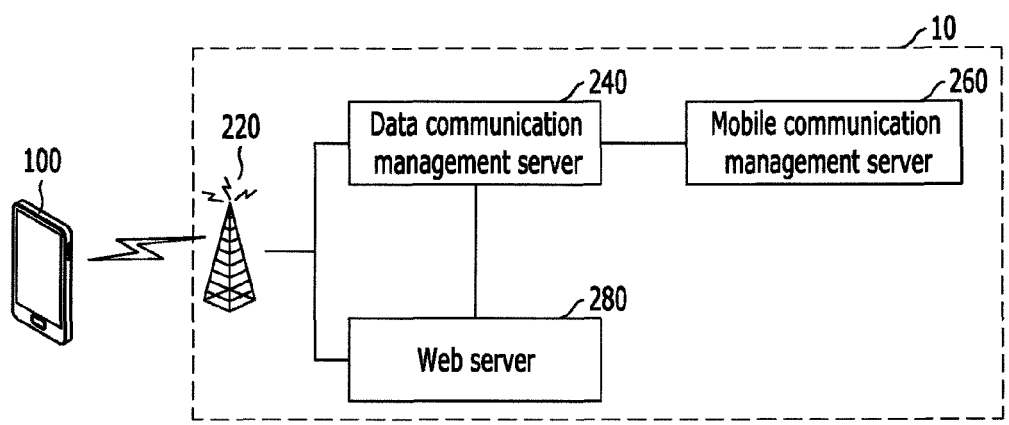
FIG. 1 illustrates a telecommunication network coupled to a user equipment for displaying a live wallpaper, in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with an embodiment of the present invention, a user equipment may set up a background of a user interface with a plurality of images each representing information that a user is interested about. When a user selects one of the images of the background after the background is displayed, the user equipment may retrieve a corresponding web page from a web server and display the web page. Accordingly, a user may conveniently and quickly monitor or update information that is of interest to the user.

Such a background may be referred to as a today wall, an active background, a live background, an active wallpaper, and/or a live wallpaper. Hereinafter, for convenience and ease of understanding, the term "live wallpaper" will be used throughout the specification in order to describe any or all of the background, the active and/or live background, and the active and/or live wallpaper. In general, the live wallpaper may be a type of application that functions as a background image of a user interface and interacts with the user in response to a user action. For example, the live wallpaper may be configured of a plurality of icons or images each associated with a set of events. When a user selects one of the icons or images in the live wallpaper, the user equipment 100 may perform a set of events associated with the selected icon or image.

As described above, a user equipment may set up a live wallpaper with a plurality of images each representing associated information, and such a user equipment may be coupled to a telecommunication network in order to obtain information therefrom.

FIG. 1 illustrates a telecommunication network coupled to a user equipment for displaying a live wallpaper, in accordance with an embodiment of the present invention.

Referring to FIG. 1, a user equipment 100 may be coupled to a telecommunication network 10. The telecommunication network 10 may include a base station 220, a data communication management server 240, a mobile communication management server 260, and a web server 280.

In accordance with an embodiment of the present invention, the user equipment 100 may set up a live wallpaper with a plurality of images related to contents received from the web server 280 in response to a user input and may display the live wallpaper as a background of a user interface. In order to communicate with the web server 280, the user equipment 100 may be coupled to the base station 220 of the telecommunication network 10 through a wireless link. Particularly, the user equipment 100 may communicate with other user equipments, terminals, or servers coupled to the telecommunication network 10 through the base station 220. Through the base station 220, the user equipment 100 may transmit the user input to the web server 280 and receive corresponding contents from the web server 280.

The user equipment 100 may receive the user input from a user. The user input may be user interest information, but is not limited thereto. For example, the user input may be a search word or an information type that the user is interested about. The information type may be related to news, music, and/or movies. Alternatively, a user may select at least one information type from one or more displayed on the user equipment 100 or from search results provided from the web server 280 and input the selected information type to the user equipment 100.

After receiving the user input, the user equipment 100 may request corresponding contents from the web server 280. In response to the request, the user equipment 100 may receive contents from the web server 280. Each content may include images related to the user input and supplementary information thereof. The user equipment 100 may set up a live wallpaper based on the contents. Particularly, the user equipment 100 may set up a live wallpaper with an image or images included in the contents.

Such a live wallpaper may be formed by arranging images included in contents in a certain format. After forming the live wallpaper, the user equipment 100 may display the live wallpaper as a background of a user interface. When a user selects one of the images of the live wallpaper, the user equipment 100 may access a web server associated with the selected image and display a related web page received from the web server. Such a user equipment 100 for displaying a live wallpaper in accordance with an embodiment will be described later in more detail with reference to FIG. 2.

The user equipment 100 may be a device capable of communicating with others, accessing the Internet, and/or receiving various types of information from the Internet. For example, the user equipment 100 may be a wideband CDMA (WCDMA) phone, a smart phone, a personal digital assistant (PDA), a computer device, an MP3 player, a notebook computer, a net-book computer, and/or an e-book.

The base station 220 may be coupled to the wireless user equipment 100 through a wireless link. The base station 220 may deliver data between the user equipment 100 and the web server 280. In order to deliver data between the user equipment 100 and the web server 280, the base station 220 may perform various operations, such as operations for processing a baseband signal, for transmitting and receiving a Radio Frequency (RF) signal, and for establishing a wireless link to the user equipment 100.

The data communication management server 240 may perform a role of a gateway that couples the user equipment 100 to the web server 280 through a communication network. The data communication management server 240 may perform operations for providing a wireless Internet service, such as transferring a request from the user equipment 100 to the web server 280 and transferring a corresponding Internet service to the user equipment 100. In order to provide the wireless Internet service, the data communication management server 240 may include a packet control function (PCF) and a packet data serving node (PDSN). The PDSN is a gateway for a wireless Internet service.

The data communication management server 240 may perform operations for matching different data types and different protocols between the user equipment 100 and the web server 280. The data communication management server 240 may receive a signal from the user equipment 100 in order to retrieve a web page corresponding to a selected image in the displayed live wallpaper. In order to retrieve the web page, the data communication management server 240 may access a corresponding web server, collect data for a related web page, and/or transmit the collected data to the user equipment 100.

The mobile communication management server 260 may include a mobile switching center (MSC) and a base station controller (BSC). The mobile communication management server 260 may detect a location of the user equipment 100 using a home location register (HLR) or a visitor location register (VLR).

The web server 280 may be coupled to the user equipment 100 through the data communication management server 240 and the base station 220. The web server 280 may provide contents related to a user input to the user equipment 100. For example, the web server 280 may provide contents to the user equipment 100 in response to a request for contents related to a user input in order to set up a live wallpaper. The contents may include images and supplementary information thereof. The supplementary information may be an access address of a web page associated with each image and a ranking of each web page. Such supplementary information may be mapped to corresponding images, and the mapping information may be stored in a memory. The access address may be a uniform resource locator (URL), and the ranking may be determined by various ways. The ranking may be decided based on a user preference, and/or based on search frequency of information related to each image, but is not limited thereto. Furthermore, the ranking may be decided by a web server based on information related to an associated web page or image. The present invention, however, is not limited thereto.

Figure 2:
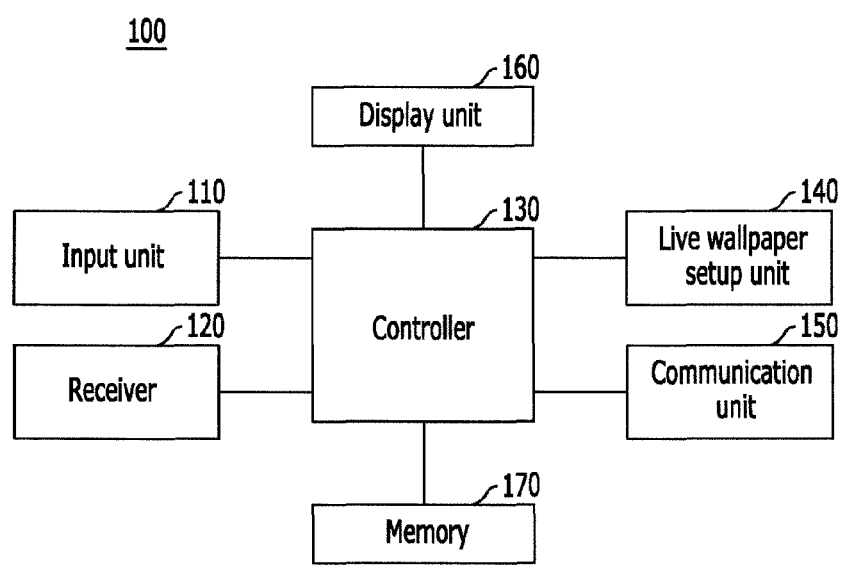
FIG. 2 illustrates a user equipment for displaying information as a live wallpaper for a background of a user interface, in accordance with an embodiment of the present invention.

FIG. 2 illustrates a user equipment for displaying information as a live wallpaper for a background of a user interface, in accordance with an embodiment of the present invention.

Referring to FIG. 2, the user equipment 100 may include an input unit 110, a receiver 120, a controller 130, a live wallpaper setup unit 140, a communication unit 150, a display unit 160, and a memory 170.

The input unit 110 may include a user interface (UI) for receiving a user input from a user. The user input may include any action that generates a signal to invoke one or more functions of the user equipment. For example, the user input may be a control command or a function selection command for controlling general operations of the user equipment 100. The function selection command may be a command to invoke a live wallpaper setup function or a command for inputting a text input. Furthermore, the user input may include user interest information. For example, the user input may be a search word or an information type that a user is interested about in order to form a live wallpaper.

The input unit 110 may receive from a user at least one of the information types selected from those displayed on the display unit 160. The input unit 110 may include a keypad for inputting such information. The keypad may be displayed on the display unit 160 when the display unit 160 is a touch screen. For example, a user may type text using the keypad through the display unit 160 in order to input information.

The input unit 110 may receive a selection signal from a user to select an information displayed as the live wallpaper. For example, a user may use the input unit 110 to select an image of the live wallpaper. Furthermore, the input unit 110 may receive an update time from a user. In accordance with an embodiment of the present invention, the update time may be a time interval for updating information and/or images displayed as the live wallpaper.

The receiver 120 may receive contents from the web server 280 in response to a user input of the user equipment 100. For example, the receiver 120 may receive a list of information types and contents having images and supplementary information thereof from the web server 280 in response to a request of a user. The receiver 120 may receive such information at every update time and update the live wallpaper accordingly.

The controller 130 may perform operations for controlling constituent elements of the user equipment 100 including the input unit 110, the receiver 120, the display unit 160, the live wallpaper setup unit 140, the communication unit 150, and the memory 170. For example, the controller 130 may control the display unit 160 to display a list of information types when the receiver 120 receives the list of information types from the web server 280. The controller 130 may control the display unit 160 to display one or more images each representing information as a live wallpaper as a user interface when the live wallpaper setup unit 140 forms the live wallpaper with images and supplementary information thereof included in the contents from the web server 280. The controller 130 may extract an access address of a web page associated with an image selected by a user from the live wallpaper and control the communication unit 150 to access the web server 280 based on the extracted access address of a web page.

The live wallpaper setup unit 140 may set up a live wallpaper based on the contents received from the web server 280 through the receiver 120. For example, the live wallpaper setup unit 140 may extract one least one image included in the contents. The at least one image may represent information that a user is interested about. Then, the live wallpaper setup unit 140 may extract an access address and a ranking of a web page associated with the extracted image. The live wallpaper setup unit 140 may form a live wallpaper by mapping an access address of a web page to at least one image and arranging the at least one image in the live wallpaper according to a resolution of the display unit 160. The live wallpaper setup unit 140 may set up sizes of images differently according to the ranking of each image. The live wallpaper setup unit 140 may update and set up images of the live wallpaper again using the contents when the contents are updated at each update time.

The communication unit 150 may request the web server 280 to send contents for setting up the live wallpaper. For example, the communication unit 150 may request contents from the web server 280 at every update time.

The communication unit 150 may retrieve a web page corresponding to an image selected by a user from the live wallpaper in response to a command given by the controller 130. The communication unit 150 may use an access address of the web page included in the supplementary data. The web page may be an electric document composed in a format of eXtensible Hyper linking Language (XHL), Hyper Text Markup Language (HTML), eXtensible Style sheet Language (XSL), and/or eXtensible Hypertext Markup Language (XHTML), but is not limited thereto. The web page may be in a format of a wireless application protocol (WAP), but is not limited thereto.

The display unit 160 may display information generated during operations of the user equipment 100 and/or display results of the operations. Furthermore, the display unit 160 may display numbers and/or texts that are input by a user through the input unit 110 in order to enable the user to confirm what has been inputted. For example, the display unit 160 may display a result of performing operations in each constituent element of the user equipment 100. The display unit 160 may display a list of information types and images received from the web server 280 through the receiver 120. The display unit 160 may display a live wallpaper formed or set up by the live wallpaper setup unit 140. The display unit 160 may display a web page received from the web server 280 through the receiver 120. The display unit 160 may display information stored in the memory 170, such as images and videos. The display unit 160 may display an operation status of the user equipment 100, such as a battery status, a signal intensity, a date, and/or a current time.

The display unit 160 may include a liquid crystal display (LCD), an organic light emitting display (OLED), or an electrophoretic display (EPD).

The memory 170 may store applications, programs, data, and/or information used by constituent elements of the user equipment 100. The memory 170 may also store data generated by constituent elements of the user equipment 100. For example, the memory 170 may store a user input received from a user and a list of information types and contents received from the web server 280 through the receiver 120. Furthermore, the memory 170 may store images, access addresses of web pages related to the images, rakings of web pages, and/or information on mapping between the images and the supplementary data thereof. The memory 170 may store a live wallpaper formed or set up by the live wallpaper setup unit 140.

The memory 170 may provide stored information and data to the controller 130, the display unit 160, the live wallpaper setup unit 140, and/or the communication unit 150 in response to requests therefrom. The memory 170 may include a plurality of sub-memories or be divided into a plurality of memories. For example, the memory 170 may be formed of a read only memory (ROM), a random access memory (RAM), and/or a flash memory.

In accordance with an embodiment of the present invention, a live wallpaper may be configured of a plurality of images each representing information that a user is interested about. That is, a live wallpaper in accordance with an embodiment of the present invention may display various pieces of information that a user is interested about. Each image may be associated with an access address of a corresponding web page. When a user selects an image of the live wallpaper, a user equipment may provide detailed information related to the selected image, for example, by displaying a web page corresponding to the selected image. Hereinafter, a method for displaying information as a live wallpaper, in accordance with an embodiment of the present invention will be described.

Figure 3:
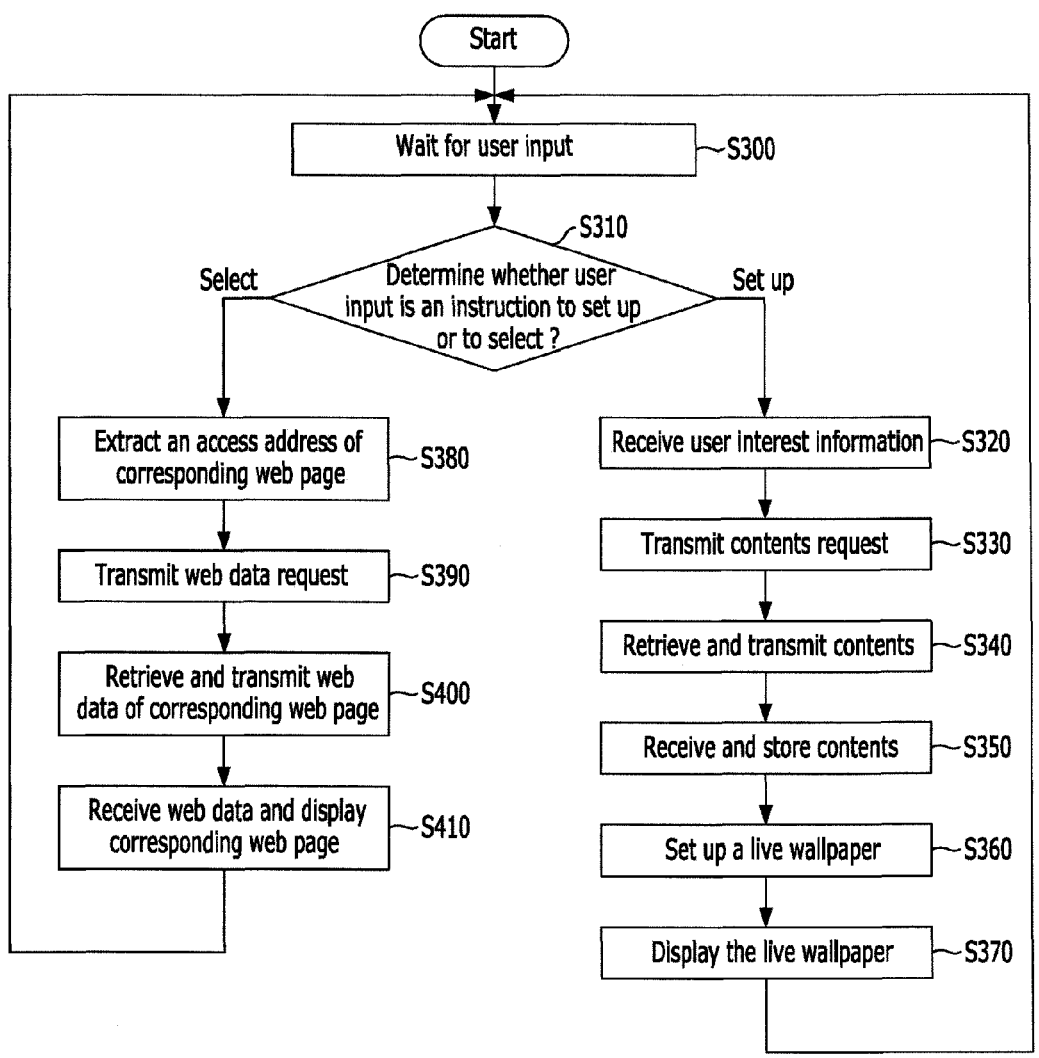
FIG. 3 illustrates a method for setting up and executing a live wallpaper, in accordance with an embodiment of the present invention.

FIG. 3 illustrates a method for setting up and executing a live wallpaper, in accordance with an embodiment of the present invention.

Referring to FIG. 3, a user interface may be displayed and a user input may be waited for S300. For example, a user equipment 100 may display a user interface on a display unit 160 and wait for a user input to be entered. The user input may be any action that generates a signal to invoke at least one function of the user equipment.

When a user input is given, a determination may be made as to whether the user input is an instruction to set up a live wallpaper or to select an image of a live wallpaper S310. For example, a user may select an icon displayed on the display unit 160 for setting up a live wallpaper. Furthermore, the user may select an image in a live wallpaper displayed on the display unit 160.

When the user input is an instruction to set up the live wallpaper (S310—Set up), user interest information may be received from a user S320. The live wallpaper may be configured of images each related to one or more user interests. In order to set up the live wallpaper, the user equipment 100 needs to obtain contents related to the user interests from a corresponding web server 280. The contents may include images and supplementary data. Accordingly, a user may input user interest information and the user equipment 100 may transmit the user interest information to the corresponding web server 280 to retrieve related contents. The user interest information may be information that the user is interested about or information that the user wants to frequency update. For example, such user interest information may be a search word or an information type that a user is interested about. Furthermore, a user may select at least one information type from a list of information types displayed on the display unit 160 through the input unit 100. For example, the information type may be news, music, movies, books, shopping, restaurants, and/or travel. The user may input text into the user equipment 100 using a keypad displayed on the display unit 160.

After receiving the user interest information, a contents request may be transmitted to a corresponding web server with the received user interest information S330. For example, the user equipment 100 may transmit a request to a corresponding web server for contents related to the user interest information.

Contents related to the user interest information may be retrieved from the web server and transmitted to the user equipment S340. For example, a web server may search for contents based on the user interest information. After retrieval of the contents, the web server may transmit the contents to the user equipment 100. When a user selects news as user interest information, the web server may search for contents related to news through the Internet. As described above, the contents may include images related to the user interest information and supplementary data thereof. In the case of news, the contents may include images associated web pages related to news and supplementary data thereof. The supplementary data may include an access address of a web page associated with each image and a ranking of a web page associated with each image. The ranking may be determined by various ways based on a user setting. The ranking may be decided based on a user preference, based on the latest search, and/or based on search frequency of information related to each image. Furthermore, the ranking may be decided by a web server based on information related to an associated web page or image. The present invention, however, is not limited thereto. For example, the ranking may be an Internet hit number of a web page associated with each image. An image associated with a web page having the largest Internet hit number may have the highest ranking. In the case of news as the user interest information, the ranking of each image may be decided based on popularity of an associated web page or based on an Intent hit number of an associated web page. Alternatively, the ranking of each image may be decided based on a user preference. When a user sets up an entertainment news as the first rank, a sports news as the second rank, and a society news as the third rank, an image related to the entertainment news may have the first ranking, an image related to the sports news may have the second ranking, and an image related to the society news may have the third ranking.

The contents may be received and stored S350. For example, the user equipment 100 may receive the contents from the web server 280. After receiving the contents, the user equipment 100 may store the contents in the memory 170.

A live wallpaper may be set up based on the received contents S360. In accordance with an embodiment of the present invention, a live wallpaper setup unit 140 may set up the live wallpaper. In order to set up the live wallpaper, the live wallpaper setup unit 140 may extract at least one image related to the user interest information from the received contents. For example, the live wallpaper setup unit 140 may select a certain number of images from the extracted images. The certain number of images to be selected may be referred to as a display number. The display number may be decided by a user or by an algorithm. That is, a user may input the display number through the input unit 110 of the user equipment 100.

After selecting the certain number of images, the live wallpaper setup unit 140 may extract supplementary data related to the selected certain number of images from the contents. The supplementary data may include an access address of a web page associated with each image. The live wallpaper setup unit 140 may map each image to a corresponding access address of a web page associated with the corresponding image. Such mapping information may be stored in the memory 170.

The live wallpaper setup unit 140 may arrange the selected images in the live wallpaper. The live wallpaper setup unit 140 may control the number of images to be arranged based on a resolution of the display unit 160. For example, the live wallpaper setup unit 140 may arrange more images when the display unit 160 supports a larger resolution. Furthermore, the live wallpaper setup unit 140 may control a size and/or a position of each image based on a ranking of each image. For example, the live wallpaper setup unit 140 may control a size of an image having the highest ranking to be larger than the other images. Furthermore, the live wallpaper setup unit 140 may control a position of an image having the highest ranking to be arranged at the center of the live wallpaper. However, the present invention is not limited thereto.

The live wallpaper may be displayed S370. For example, the user equipment 100 may display the live wallpaper on the display unit 160.

After displaying the live wallpaper, another user input may be waited S300.

When the user input is to select an image in a live wallpaper displayed on the display unit 160 (S310—Select), an access address of a web page mapped to the selected image may be extracted 5380. For example, the user equipment 100 may retrieve an access address of a corresponding web page from the memory 170 based on the stored mapping information.

A web data request may be transmitted to a corresponding web server based on the extracted access address S390. For example, the user equipment 100 may transmit a web data request to the web server 280 in order to open a web page related to the selected image.

Web data for a corresponding web page may be retrieved and transmitted to the user equipment S400. For example, the web server 280 may retrieve web data for a corresponding web page in response to the web data request from the user equipment 100. After retrieving the web data, the web server 280 may transmit the web data to the user equipment 100.

The web data may be received and the corresponding web page may be displayed S410. For example, the user equipment 100 may receive the web data from the web server 280 and display a corresponding web page based on the received web data.

As described above, the live wallpaper may be set up with images related to user interests. A user may quickly and conveniently receive updated information through the live wallpaper. Hereinafter, examples of setting up and using the live wallpaper in accordance with an embodiment of the present invention will be described with reference to FIGS. 4A to 5B.

Figure 4A:
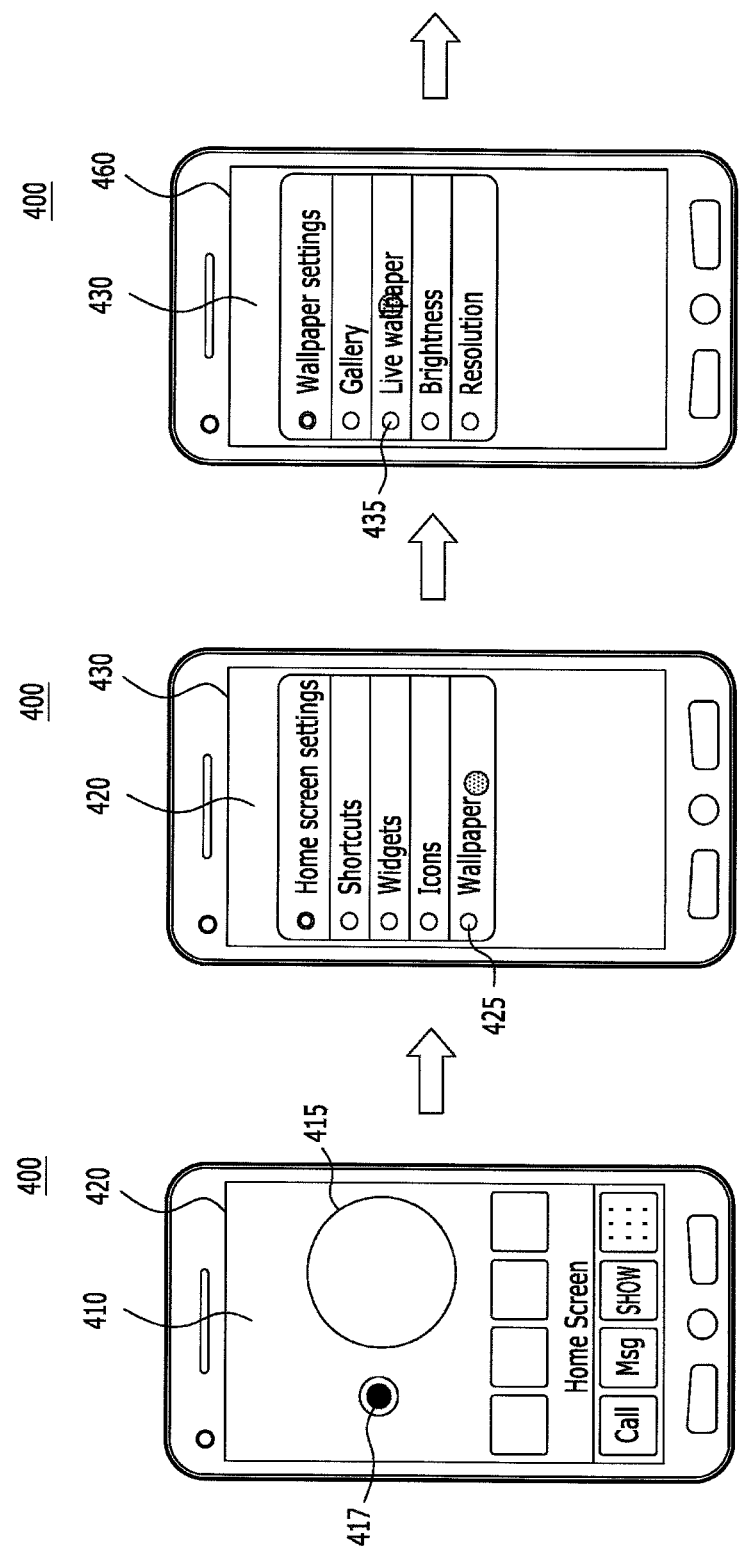
FIGS. 4A and 4B illustrate an example of setting up a live wallpaper of a user equipment, in accordance with an embodiment of the present invention.
Figure 4B:
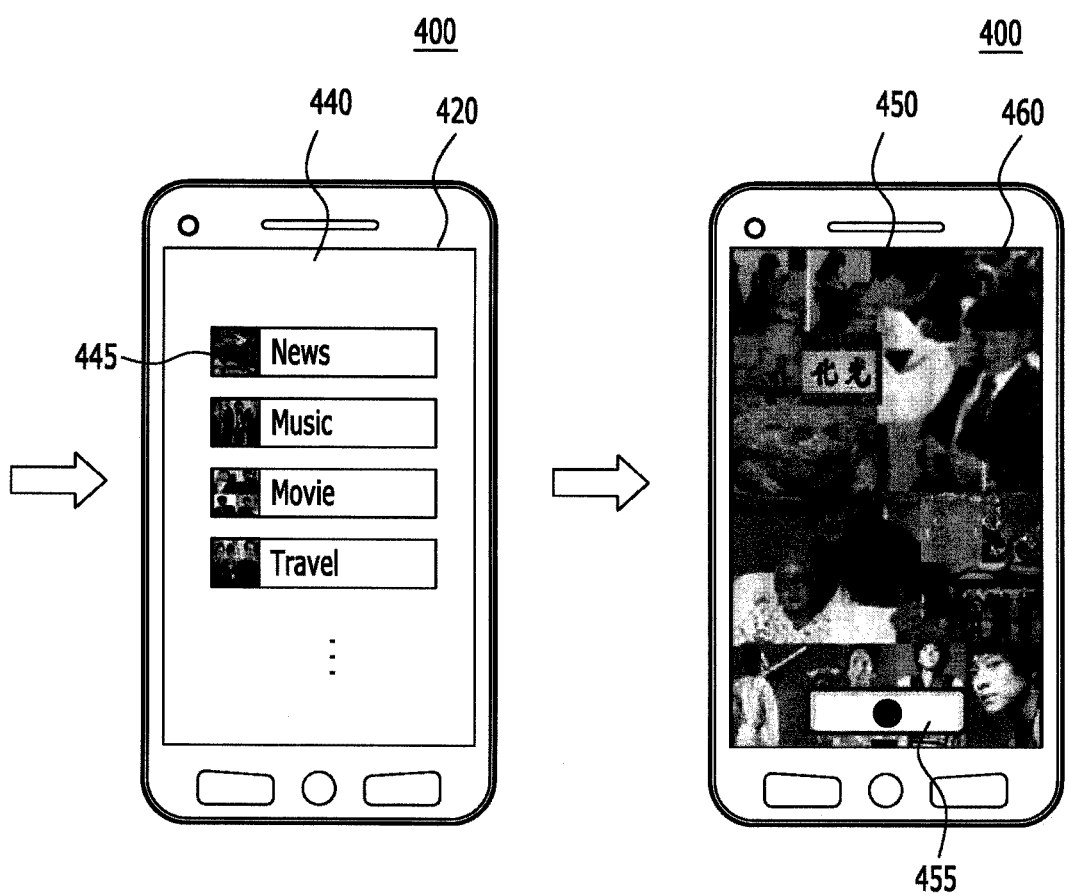

FIGS. 4A and 4B illustrate an example of setting up a live wallpaper of a user equipment, in accordance with an embodiment of the present invention.

Referring to FIG. 4A, a user equipment 400 may display a home screen 410 on a display unit 460 before setting up a live wallpaper in accordance with an embodiment of the present invention. The home screen 410 may be a default graphical user interface (GUI) that a user may interact with in order to enter inputs and/or requests. The GUI may output information in response to various user requests.

Before setting up the live wallpaper, the home screen 410 may include a wallpaper such as a background image and a plurality of icons and menu keys displayed on the wallpaper. The plurality of icons may include a home screen setting icon 415 for invoking a home screen setting function.

When a user selects the home screen setting icon 415, the user equipment 400 may carry out a home screen setting function. Using the home screen setting function, a user may set up the home screen including setting up a live wallpaper in accordance with an embodiment of the present invention as well as adding icons, shorts, and widgets and/or changing properties of the home screen. Alternatively, the home screen setting function may be invoked when a user selects any unblocked area 417 of the wallpaper. The unblocked area 417 may be an area that is not blocked by icons or menu keys in the home screen. When a user selects the unblocked area 417 of the typical wallpaper, the user equipment 400 may display menu keys for performing a home screen setting function.

When the home screen setting function is invoked in response to a user input as described above, the user equipment 400 may display a home screen setting interface 420. The home screen setting interface 420 may include a plurality of options including a wallpaper setting option 425. The home screen setting interface 420 may further include an option for adding shortcuts, an option for adding widgets, and an option for changing properties such as a font size or an icon size.

When a user selects the wallpaper setting option 425, the user equipment 400 may display a wallpaper setting interface 430. The wallpaper setting interface 430 may include a live wallpaper setting and activating option 435. The live wallpaper setting and activation option 435 may be associated with a live wallpaper setting and activating function.

When a user selects the live wallpaper setting and activating option 435, an information selection interface 440 may be displayed on the display unit 460. The information selection interface 440 may include various information types, such as news, music, movie, and travel.

When a user selects one of the information types, the user equipment 400 may collect contents based on the selected information type from corresponding web servers and form a live wallpaper based on the collected contents.

After forming the live wallpaper, the user equipment 400 may display the live wallpaper 450 as a preview. If a user likes the live wallpaper 450, a user may activate a confirmation key 455. In response to the activation of the confirmation key, the user equipment 400 may display the live wallpaper 450 on the display unit 460.

Figure 5B:
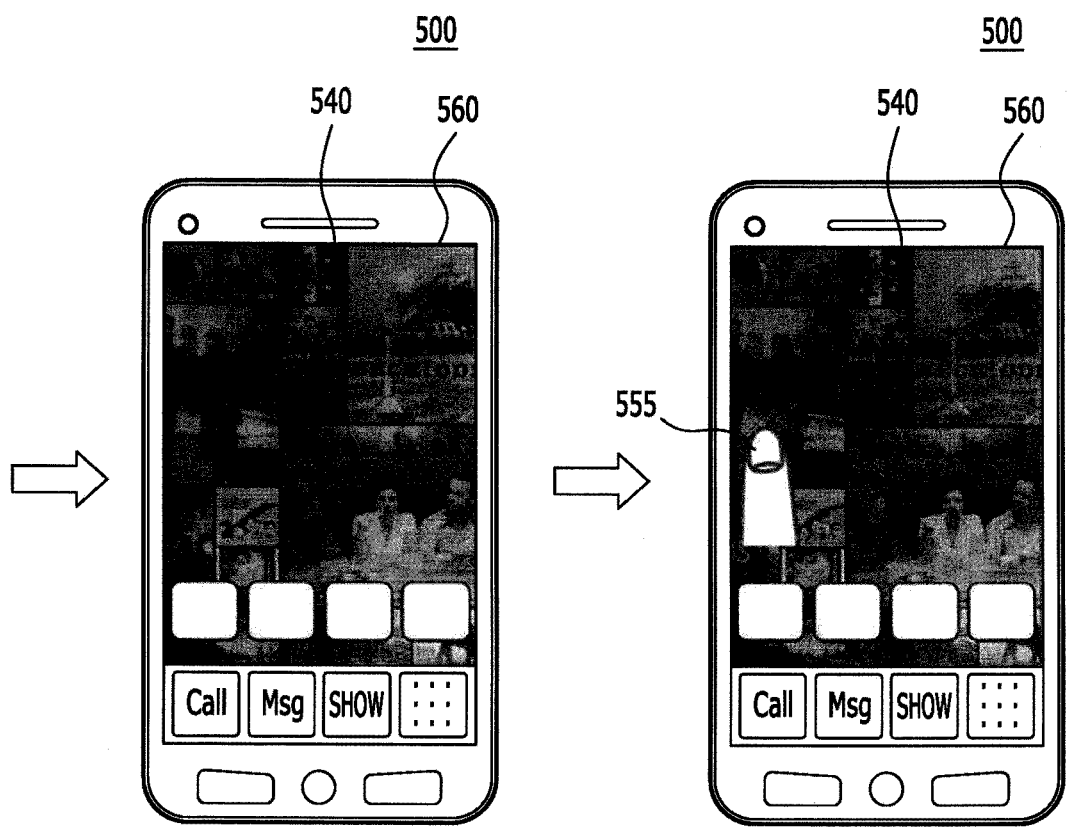

FIGS. 5A and 5B illustrate another example of setting up and using a live wallpaper in accordance with an embodiment of the present invention.

Referring to FIG. 5A, a user equipment 500 may display a live wallpaper setting interface 510 on a display unit 560. Such a live wallpaper setting interface 510 may be displayed after the user selects the live wallpaper setting and activating option 435 from the wallpaper setting interface 430 as shown in FIG. 4A. The live wallpaper setting interface 510 may include input windows to receive inputs from a user. A user may input user interest information and/or options for a live wallpaper through the input windows. For example, the live wallpaper setting interface 510 may include a search word input window 513 and an update time setting window 515. The user may input a word "magazine" into the search word input window 513 and input a time of "10 minutes" into the update time setting window 515.

The user equipment 500 may update images of the live wallpaper at an interval of the update time set up by the user, for example, 10 minutes.

After inputting the user interest information and/or options for the live wallpaper, the user equipment 500 may display a message 520 on the display unit 560 in order to inform the user that the live wallpaper is being configured with images related to the input user interest information from the user. Then, the user equipment 500 may display a status 530 of forming the live wallpaper.

After completing the configuration of the live wallpaper, the user equipment 500 may display the live wallpaper 540 with icons and keys on the display unit 560 of the user equipment 500.

A user may select one image of the live wallpaper 540 using their finger 555. In this case, the user equipment 500 may access a web server based on an access address associated with the selected image and display a web page received from the web server.

In accordance with embodiments of the present invention, the method for setting up and using a live wallpaper may be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

The term "coupled" has been used throughout to mean that elements may be either directly connected together or may be coupled through one or more intervening elements.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for displaying information as a background of a user interface in a user equipment, the method comprising:
   activating a background setting user interface according to a user request;
   receiving information for a background creation from a user, through the background setting user interface;
   automatically accessing a web server and transmitting a request for contents related to the received information to the web server, when the information is received from the user;
   automatically receiving the contents related to the received information in response to the request for the contents, from the web server;
   forming the background of the user interface with at least one image, wherein (i) each image of the at least one image represents a respective one of the received contents and allows an access to a corresponding content, and (ii) the background is formed by arranging the at least one image, according to a predetermined arrangement criteria associated with an image display on at least one divided screen region, wherein the arranging the at least one image according to the predetermined arrangement criteria includes controlling at least one of a size and a position of each of the at least one image according to a ranking associated with each image; and
   displaying the user interface having the background formed with the at least one image.

2. The method of claim 1, wherein the forming the background comprises:
   extracting the at least one image from the received contents;
   extracting supplementary data associated with the extracted at least one image from the received contents;
   mapping the extracted at least one image with corresponding supplementary data;
   storing a result of the mapping; and
   arranging the extracted at least one image to form at least a portion of the background.

3. The method of claim 2, wherein the forming the background further comprises:

selecting at least one image of the extracted at least one image according to a resolution of a display unit upon which the user interface is provided and the ranking associated with each image,
wherein the selected at least one image is arranged to form at least a portion of the background.

4. The method of claim 1, wherein the size of a first image of the at least one image is controlled to be larger than other images of the at least one image when the first image has a ranking higher than the other images.

5. The method of claim 1, wherein the position of a first image of the at least one image having a ranking higher than other images of the at least one image is positioned at a center of the background of the user interface.

6. The method of claim 2, wherein after the displaying the user interface, the method further comprises:
receiving a selection input for selecting a desired image from the background formed with the at least one image;
extracting an access address of a web page corresponding to the selected desired image based on the stored result of the mapping;
retrieving data for the corresponding web page using the extracted access address; and
displaying the corresponding web page based on the retrieved data.

7. The method of claim 1, wherein the information received from the user comprises at least one of a search word and an information type that the user is interested about.

8. The method of claim 7, wherein:
the contents comprise at least one image related to the information received from the user and supplementary data associated with each image of the at least one image, and the supplementary data comprises an access address and a ranking of a web page related to each image of the at least one image; and
each image of the at least one image represents a respective type of the information received from the user.

9. The method of claim 8, wherein:
the ranking of each web page is determined based on at least one of a user stipulation, an associated web server, a search frequency of related information type, and an Internet hit count of the corresponding web page.

10. The method of claim 1, wherein after the displaying the user interface having the background, the method further comprises:
receiving updated contents; and
updating the displayed user interface having the background with the received updated contents at an update interval of time.

11. The method of claim 1, wherein the number of images to be used for forming the background of the user interface is determined based on at least one of a user selection and a resolution of the user equipment.

12. A method for displaying information in a wallpaper of a user interface at a user equipment, the method comprising:
activating a wallpaper setting user interface according to a user request;
receiving a user input for selecting an information type for a wallpaper creation through the wallpaper setting user interface;
automatically establishing a communication connection between the user equipment and a web server when the user input for selecting the information type is received;
automatically transmitting a request for contents to the web server based on the selected information type, through the communication connection;
automatically receiving contents related to the selected information type in response to the request for the contents, from the web server;
selecting at least one image included in the received contents;
extracting the selected at least one image;
extracting an access address of a respective web page associated with each one of the selected at least one image;
mapping the extracted at least one image with associated extracted access addresses associated with respective ones of the selected at least one image;
arranging the extracted at least one image according to a predetermined arrangement criteria associated with an image display on at least one divided screen region;
displaying the arranged at least one image as at least a portion of the wallpaper;
selecting a desired image from the displayed at least one image of the wallpaper; and
accessing a web page associated with the desired image using a corresponding access address mapped to the desired image,
wherein the arranging includes controlling at least one of a size and a position of each of the extracted at least one image according to a ranking associated with each image, and
wherein the ranking represents a ranking of a web page related to each image.

13. The method of claim 12, further comprising:
updating the displayed at least one image at an update interval of time by receiving update contents based on the access addresses mapped to the at least one image.

14. The method of claim 12, wherein the selecting at least one images includes:
determining the number of images to be used for forming the wallpaper of the user interface, based on at least one of a user selection and a resolution of the user equipment.

15. An apparatus for displaying information as a background of a user interface, the apparatus comprising:
at least one hardware processor which executes:
an input unit configured to receive information for a background creation through an input device from a user;
a communication unit configured (i) to automatically access a web server through a communication network when the information is received from the user, (ii) to automatically transmit a request for contents related to the received information to the web server through the communication network, and (iii) to automatically receive the related contents in response to the request for the contents from the web server through the communication network;
a background formation unit configured to form the background of the user interface with at least one image, wherein (i) each image of the at least one image represents a respective one of the received contents and allows an access to a corresponding content, and (ii) the background is formed by arranging the at least one image according to a predetermined arrangement criteria associated with an image display on at least one divided screen region; and
a display unit configured (i) to display, on a display screen, a background setting user interface which enables the user to input the information and (ii) to display, on the display screen, the user interface having the background formed with the at least one image, wherein the background formation unit is configured to arrange the at least one image by controlling at least one of a size and a position of each of the at least one image according to a ranking associated with each image, wherein the ranking represents a ranking of a web page related to each image.

16. The apparatus of claim 15, wherein the background formation unit is configured to:
extract the at least one image from the received contents;
extract supplementary data associated with the extracted at least one image from the received contents;
map the extracted at least one image with corresponding supplementary data;
store a result of the mapping; and
arrange the extracted at least one image to form at least a portion of the background.

17. The apparatus of claim 16, wherein the background formation unit is configured to select at least one image of the extracted at least one image according to a resolution of a display unit upon which the user interface is provided and the ranking associated with each image.

18. The apparatus of claim 16, wherein the ranking of each web page is determined based on at least one of a user stipulation, an associated web server, a search frequency of related information type, and an Internet hit count of the corresponding web page.

19. The apparatus of claim 15, wherein:
the contents comprise at least one image related to the information received from the user and supplementary data associated with each image of the at least one image, and the supplementary data comprises an access address and the ranking of each image of the at least one image; and
each image of the at least one image represents a respective type of the information received from the user.

20. The apparatus of claim 15, wherein the background formation unit is configured to determine the number of images to be used for forming the background of the user interface, based on at least one of a user selection and a resolution of the display unit.

* * * * *